United States Patent [19]

Mölders

[11] 4,078,779
[45] Mar. 14, 1978

[54] PNEUMATIC SPRING WITH MANUALLY RELEASABLE STOP

[75] Inventor: Werner Mölders, Mayen, Germany

[73] Assignee: Stabilus GmbH, Koblenz-Neuendorf, Germany

[21] Appl. No.: 746,829

[22] Filed: Dec. 2, 1976

[30] Foreign Application Priority Data

Dec. 12, 1975 Germany .................. 7539577[U]

[51] Int. Cl.² .............................................. F16F 9/32
[52] U.S. Cl. ........................................ 267/120; 92/18;
188/300; 292/268; 292/278; 292/338
[58] Field of Search ............... 267/8 R, 65 R, 120,
267/124; 16/49, 66, 84; 92/15, 18, 19, 26;
188/67, 300; 248/354 R, 354 C, 354 P, 407, 408,
409; 292/265, 268, 278, 338, 339; 296/56, 76;
217/60 R, 60 B, 60 F; 403/104, 329, 378

[56] References Cited

U.S. PATENT DOCUMENTS

| | | | |
|---|---|---|---|
| 1,142,023 | 6/1915 | Chott | 92/18 |
| 2,220,876 | 11/1940 | Carter | 217/60 F |
| 2,947,376 | 8/1960 | Norrie | 217/60 F X |
| 3,469,870 | 9/1969 | Barkus | 248/407 X |
| 3,789,742 | 2/1974 | Hershman et al. | 92/26 |
| 3,851,867 | 12/1974 | Fricko | 267/120 |
| 3,883,126 | 5/1975 | Nicholls | 267/65 R |
| 3,938,793 | 2/1976 | Kaptanis et al. | 267/120 |

*Primary Examiner*—Johnny D. Cherry
*Attorney, Agent, or Firm*—Hans Berman

[57] ABSTRACT

A pneumatic spring having a cylinder and a piston rod biased axially outward of the cylinder by compressed gas in the cylinder cavity may be stopped in an axially intermediate position of the rod by engagement of respective radial faces on an abutment member mounted on the rod for axial movement and on a rigid abutment member fixedly mounted on the cylinder and projecting into the normal axial path of the other abutment member which may be deflected manually from its normal path for release of the rod.

6 Claims, 4 Drawing Figures

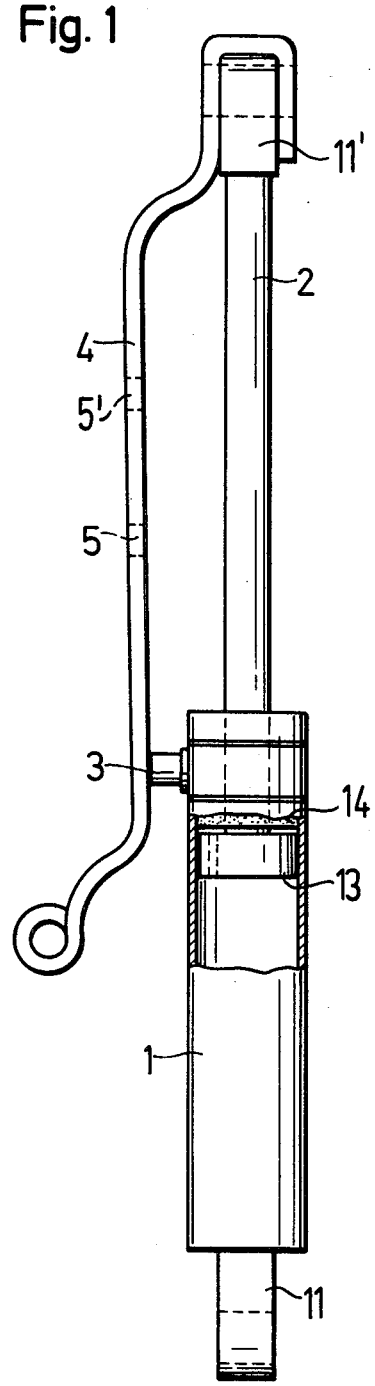
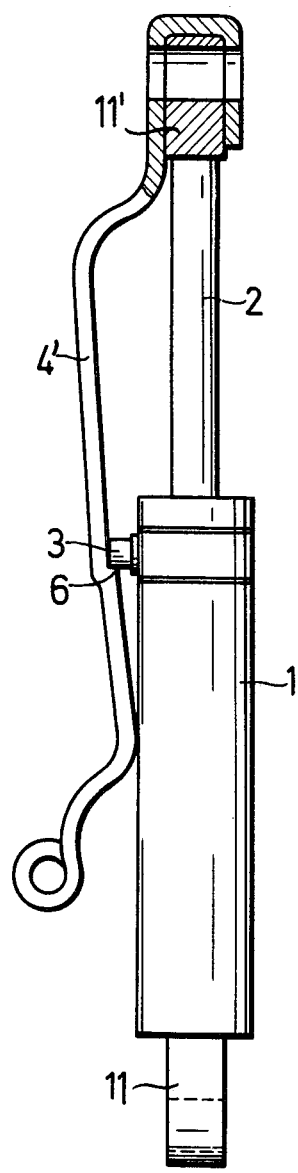

U.S. Patent  March 14, 1978  Sheet 2 of 2  4,078,779
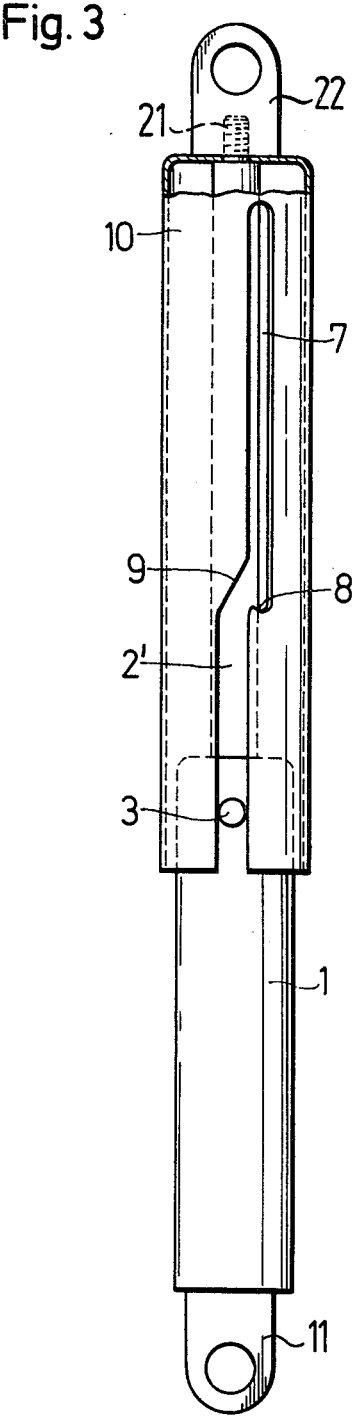
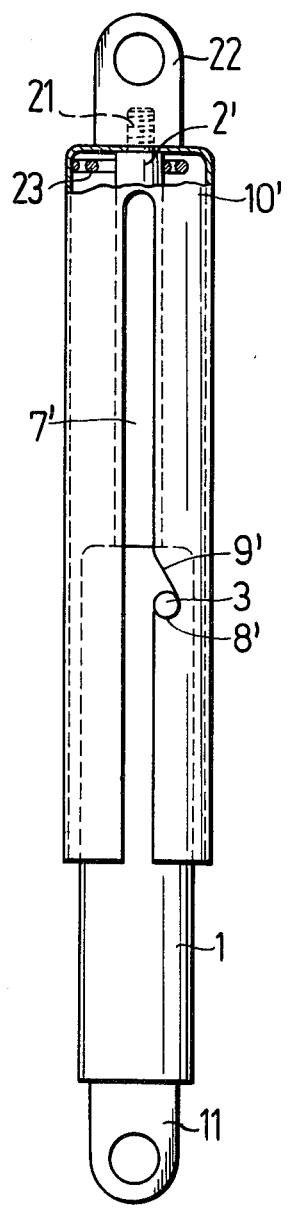

PNEUMATIC SPRING WITH MANUALLY RELEASABLE STOP

This invention relates to pneumatic springs, and more particularly to a pneumatic spring arrangement in which a rod is biased outward of a cylinder by compressed gas in the cylinder cavity, and the movement of the rod may be stopped in a manually releasable position.

Pneumatic springs have been found useful for facilitating the opening of hoods and trunk lids in automotive vehicles, and latch arrangements associated with the springs have been proposed for holding a hood or lid in a fully open position against wind pressure or the like. None of the known pneumatic spring arrangements can hold a hood or trunk lid securely in a partly opened, fixed position.

It has been found that such a partly open, secured position is desirable under many common conditions. If a load, such as skis or bicycles, is supported on a roof carrier of a motorcar and projects rearward from the roof, damage to the load and/or the trunk lid may occur if the lid is unlocked and is swung against the load by a pneumatic spring. If skis or bicycles are secured in the trunk, but project rearwardly from the vehicle, the conventional trunk lid must be tied down for protection of the load even if the trunk cannot be closed. A hood only partly open, but angularly secured, is desirable when access to the engine is needed in windy, rainy weather. Other applications for a pneumatic spring capable of an intermediate, fixedly locked condition during its expansion will readily suggest themselves.

It is a primary object of this invention to provide a pneumatic spring arrangement which permits an object biased upward by a pneumatic spring to be held securely in at least one position intermediate the topmost and lowermost positions defined by the stroke of the spring.

With this object and others in view, as will hereinafter become apparent, the invention provides a pneumatic spring arrangement in which a cylinder bounds a cavity, and a rod is axially movable inward and outward of the cavity in sealing engagement with the cylinder. Yieldably resilient means in the cavity outwardly bias the rod. A first abutment member has an abutment face transverse to the cylinder axis and is mounted on the rod outside the cylinder cavity for movement of its abutment face in an axial path during axial movement of the rod. A second, rigid abutment member is fixedly mounted on the cylinder and has a transverse abutment face projecting toward the afore-mentioned path for engagement with the other abutment face. Manually operable means are provided for deflecting the abutment face of the first abutment member out of this path for avoiding engagement of the two faces and for release of the two abutment members from each other.

Other features and many of the attendant advantages of this invention will readily be appreciated as the same becomes better understood by reference to the following detailed description when considered in connection with the appended drawing in which:

FIGS. 1 to 4 show respective pneumatic spring arrangements of the invention in side elevation, and partly in section to reveal internal structure.

Referring initially to FIG. 1, there is shown a cylinder 1 having an imperforate end wall and an annular end wall from which a piston rod 2 projects. A seal 14 prevents the escape of compressed air or nitrogen from the cylinder cavity along the piston rod 2. A piston 13 is attached to the piston rod 2 in the cylinder cavity and is provided with a throttling passage connecting the compartments of the cylinder cavity on axially opposite sides of the piston 13. A mounting eye 11 is fastened to the imperforate end wall of the cylinder 1, and another eye 11' is fastened to the outer axial end of the piston rod 2. The structure described so far is conventional and operates in a well known manner. The pressure of the gas in the cylinder 1 tends to expel the piston rod 2 from the cylinder cavity, and a trunk lid attached to the eye 11' may be biased toward the open position by the pneumatic spring constituted by the rod 2, piston 13, and cylinder 1 if the eye 11 is suitably fastened to the body of a motor car.

One hook-shaped end of a leaf spring 4 is clamped over the eye 11' and provided with openings aligned with that of the eye so that a pin (not shown) which attaches the piston rod 2 to the trunk lid will also fasten the spring 4 to the rod 2 and prevent rotation of the rod about the cylinder axis. The main portion of the spring 4 is straight and elongated in the direction of the cylinder axis, and its other end is bent into a closed loop to provide a handle. The straight spring portion is held in radially abutting engagement with a transverse end face of a cylindrical pin 3 of rigid metal projecting radially outward from the axial wall of the cylinder 1.

The straight portion of the spring 4 has two axially spaced bores 5, 5' dimensioned to receive the pin 3. Because of the resiliency of the spring 4, the pin 3 drops into the aligned bore 5 when the spring contracts from the illustrated, fully expanded condition under manual pressure applied to the trunk lid attached to the eye 11'. Abutting engagement of a first set of oppositely directed abutment faces on the pin 3 and on the spring 4 in the bore 5 prevents further movement of the piston rod 2 inward of the cylinder 1. If the spring is manually deflected to disengage the pin 3 from the bore 5, the spring may be contracted further until the pin 3 drops into the bore 5'.

During expansion of the pneumatic spring from the fully contracted condition, movement of the piston 13 is similarly arrested in two positions intermediate the two ends of the piston stroke defined by abutting engagement of the piston 13 with the seal 14 and the imperforate end wall of the cylinder 1 respectively, and it may be released from either intermediate position by bending the spring 4 until a second set of respective abutment faces of the pin 3 and the spring 4 transverse to the cylinder axis no longer engage each other in one of the bores 5, 5'.

The spring arrangement shown in FIG. 2 differs from that described with reference to FIG. 1 by a leaf spring 4' whose main portion is imperforate but offset to form a shoulder 6. An abutment face of the shoulder 6 transverse to the cylinder axis is directed toward the eye 11' and engages an opposite face of the pin 3 during expansion of the pneumatic spring only. During axially inward movement of the piston rod 2 relative to the cylinder 1, the shoulder 6 slides over the pin 3 without interfering with the closing movement of a trunk lid attached to the eye 11'. The lid may be fully opened only if the shoulder 6 is deflected from its normal path of axial movement with the piston rod 2.

In the spring arrangement illustrated in FIG. 3, the cylinder 1 and pin 3 are not significantly different from the corresponding elements shown in FIGS. 1 and 2. The piston rod 2' axially projecting from the cylinder 1 carries a non-illustrated piston in the cavity of the cylinder 1, as shown in FIG. 1. Its outer end portion 21 is reduced and threadedly received in a mating bore of a fastening eye 22 which is short enough to leave an annular gap between a shoulder of the rod 2' and an adjacent radial face of the eye 22 when the reduced end portion 21 is fully screwed into the eye 22.

A shell 10 having the approximate shape of a tall, narrow, inverted cup coaxially envelops the piston rod 2' and at least a portion of the cylinder 1. An aperture in the bottom portion of the cup shape movably receives the reduced end portion 21 and is axially secured, but angularly movable, in the afore-mentioned annular gap. A slot 7 between two axial edges of the shell 10 has two straight, axially elongated portions connected by a portion of the slot bounded on one side by an oblique cam face 9 on one edge and on the other side by a shoulder 8 having a generally radial, concave abutment face directed toward the eye 22 and bounding a recess in the other edge.

As shown in FIG. 3, the pneumatic spring is in the fully expanded condition in which a non-illustrated, associated trunk lid is wide open. When the trunk lid is closed by manual pressure against the restraint of the compressed gas in the cylinder 1, the pin 3 travels axially in the lower straight portion of the slot 7 until it cammingly engages the oblique face 9, and causes the shell 10 to turn on the reduced rod portion 21. The piston rod 2' continues its uninterrupted axial movement to the end of the piston stroke while the pin 3 moves in the upper straight portion of the slot 7, the piston rod 2' and the cylinder 1 being prevented from rotating about their common axis by the fastened eyes 11, 22.

When the spring thereafter is permitted to expand in order to raise the lid, the pin 3 moves in the upper portion of the slot 7 until it abuts against the concave face of the shoulder 8 and arrests the lid in a partly opened, intermediate position. The shell 10 may be turned manually to release the pin 3 for further movement toward the fully illustrated position.

FIG. 4 shows a modification of the spring arrangement of FIG. 3 in which a shell 10', otherwise similar to the shell 10, has a slot 7' which is straight over its entire axial length, from a closed upper end near the eye 22 to an open lower end. A circumferential recess in an axial edge of the slot 7' is bounded partly by a concave abutment face transverse to the cylinder axis on a shoulder 8' of the shell 10', and otherwise by a cam face 9' sloping obliquely away from the slot 7' toward the eye 11. A wire spring 23 spirals about the piston rod 2' within the shell 10', and its ends are fastened in a common radial plane near the eye 22 to the rod 2' and the shell 10'.

In the position illustrated in FIG. 4, the piston attached to the piston rod 2', but not visible in the drawing, is approximately centered between the two ends of its stroke. The pin 3 is retained on the abutment face of the shoulder 8' by the gas pressure in the cylinder 1 and by the spring 23 which tends to turn the shell 10' clockwise, as viewed axially from the eye 22. The pneumatic spring cannot expand beyond the illustrated intermediate position unless the shell 10' is turned manually against the restraint of the spiral spring 23.

The pin 3 does not impede contraction of the pneumatic spring from the illustrated position nor from the fully expanded position because the pin travels smoothly along the cam face 9'.

While only one position of a piston rod intermediate the end positions of its stroke can be maintained by means of the pin 3 in the pneumatic spring arrangements of FIGS. 2 to 4, it will be obvious from FIG. 1 that two or more intermediate positions can be defined by an abutment face of the pin 3 and respective abutment faces of the leaf spring 4', the shell 10, or the shell 10'. The leaf spring 4' may be offset to provide more than one shoulder 6. The slot 7 in the shell 10 may have three or more straight axial sections connected by two or more cam faces 9 and shoulders 8, and more than one recess bounded by a cam face 9' and a shoulder 8' may be formed in the shell 10'.

The piston 13, the seal 14, and an imperforate cylinder wall define terminal positions limiting inward and outward movement of the piston rod 2 in FIG. 1, and analogous structure is implied though not explicitly illustrated in FIGS. 2 to 4. However, the stroke of the piston rod may be limited otherwise, as by abutments engaging a trunk lid or hood attached to the eyes 11', 22.

The main portion of the leaf spring 4 is biased toward the position shown in FIG. 1 principally by resilient stresses in a portion of the spring adjacent the eye 11', but the use of a similar rigid bar formed with the bores 5, 5' and hingedly fastened to the piston rod 2 is specifically contemplated if the bar is biased by a spring toward engagement by the pin 3.

The shoulders 6 and 8 bound respective recesses in the spring 4 and the tubular portions of the shells 10, 10' in a downward direction, as viewed in the drawing, that is, in the direction of axial movement of the piston rods 2, 2' inward of the cylinder 1 so that the spring arrangements shown in FIGS. 2 to 4 are arrested in an intermediate position without an operator's intervention only during their expansion. The recesses or bores 5, 5' are also closed in the other axial direction and arrest the piston rod 2 during its inward movement unless the spring 4 is manually deflected. If so desired for a specific application, the spring 4' may be provided with two shoulders bounding recesses open in opposite directions, and analogous modifications of the spring arrangement shown in FIGS. 3 and 4 will readily suggest themselves.

The leaf springs 4, 4' have looped ends which are conveniently grasped by a hand for deflecting the bores 5, 5' out of a path of engagement by the pin 3. The shells 10, 10' are readily grasped for manual turning about the cylinder axis, whereby the shoulders 8, 8' may clear the pin 13 during expansion of the pneumatic springs, but handles may be attached to the shells in an obvious manner if direct access is not available.

It should be understood, therefore, that the foregoing disclosure relates only to preferred embodiments of the invention, and that it is intended to cover all changes and modifications of the examples herein chosen for the purpose of the disclosure which do not constitute departures from the spirit and scope of the invention set forth in the appended claims.

What is claimed is:

1. A pneumatic spring arrangement comprising:
   (a) a cylinder member having an axis and bounding a cavity therein;
   (b) a rod member axially movable inward and outward of said cavity in sealing engagement with said cylinder member;
   (c) compressed gas in said cavity outwardly biasing said rod member;

(d) a first abutment member mounted on said rod member outside said cavity for limited angular movement about said axis,
  (1) a portion of said abutment member being tubular and enveloping said rod member and at least a portion of said cylinder member during axial movement of said rod member,
  (2) said portion of said abutment member being formed with an axially extending slot and including two edge portions circumferentially bounding a straight, axial portion of said slot,
  (3) one of said edge portions being formed with a recess extending circumferentially inward of said one edge portion from said slot,
  (4) said one edge portion having a first abutment face transverse to said axis and a cam face obliquely inclined relative to said axis axially adjacent said first abutment face, said abutment face and said cam face bounding said recess;
(e) a second, rigid abutment member fixedly mounted on said cylinder member and movably received in said slot, said second abutment member having a second abutment face;
(f) yieldably resilient means biasing said first abutment member angularly relative to said rod member toward a position of abutting engagement of said first and second abutment faces during axial movement of said rod member; and
(g) manually operable deflecting means for deflecting said first abutment member from said position.

2. An arrangement as set forth in claim 1, further comprising means defining respective terminal positions limiting inward and outward movement of said rod member, said abutment faces when engaged defining a position of said rod member spacedly intermediate said terminal positions.

3. An arrangement as set forth in claim 1, wherein said recess of said first abutment member is bounded by said first abutment face in the direction of inward axial movement of said rod member.

4. An arrangement as set forth in claim 3, wherein said recess is closed in the direction of outward axial movement of said rod member.

5. A pneumatic spring arrangement comprising:
(a) a cylinder member having an axis and bounding a cavity therein, said cylinder member having two abutment faces directed in opposite axial directions;
(b) a rod member axially movable inward and outward of said cavity in sealing engagement with said cylinder member between an innermost position and as outermost position;
(c) compressed gas in said cavity outwardly biasing said rod member,
  (1) said rod member having two abutment faces outside said cavity and respectively directed in said opposite axial directions,
  (2) each engagement face of said cylinder member being positioned for engagement by the outwardly directed engagement face of said rod member during axial movement of said member;
  (3) one of the engagement faces of said cylinder member when engaged by the oppositely directed engagement face of said rod member preventing movement of said rod member under the biasing force of said gas, beyond a position remote from said outermost position,
  (4) the other engagement face of said cylinder member, when engaged by the oppositely directed engagement face of said rod member, preventing movement of said rod member inward of said cylinder member; and
(d) manually operable deflecting means for deflecting each of the abutment faces on said rod member from engagement with the oppositely directed abutment face of said cylinder member.

6. An arrangement as set forth in claim 5, further comprising yieldably resilient means biasing said engagement faces of said rod member into engagement by the respective, oppositely directed engagement faces of said cylinder member during said axial movement of said rod member.

* * * * *

UNITED STATES PATENT AND TRADEMARK OFFICE
CERTIFICATE OF CORRECTION

PATENT NO. : 4,078,779
DATED : March 14, 1978
INVENTOR(S) : WERNER MÖLDERS

It is certified that error appears in the above-identified patent and that said Letters Patent are hereby corrected as shown below:

Claim 5, in each of lines 15, 17, 19, 21, 25, and 27, change "engagement" to -- abutment --.

Claim 6, line 2, cancel "en-";
line 3, change "gagement" to -- abutment --;
line 4, change "engagement" to -- abutment --.

Signed and Sealed this

Twenty-fifth Day of July 1978

[SEAL]

Attest:

RUTH C. MASON
Attesting Officer

DONALD W. BANNER
Commissioner of Patents and Trademarks